United States Patent [19]
Spratlen

[11] 3,791,676
[45] Feb. 12, 1974

[54] TRAILER ATTACHMENT

[76] Inventor: James H. Spratlen, Asheville Rd., Beloit, Kans. 67420

[22] Filed: Aug. 25, 1972

[21] Appl. No.: 283,628

[52] U.S. Cl. ............................ 280/475, 280/150.5
[51] Int. Cl. ............................................ B60d 1/14
[58] Field of Search ...................... 280/475, 150.5

[56] References Cited
UNITED STATES PATENTS

| | | | |
|---|---|---|---|
| 2,621,940 | 12/1952 | Gorham | 280/475 R |
| 2,078,413 | 4/1937 | Ronning | 280/475 R |
| 2,865,658 | 12/1958 | Dubuque | 280/475 R |
| 2,474,483 | 6/1949 | Luttrell | 280/150.5 R |
| 2,400,145 | 5/1946 | Zink et al. | 280/475 R |

FOREIGN PATENTS OR APPLICATIONS

| | | | |
|---|---|---|---|
| 483,008 | 5/1952 | Canada | 280/475 |

*Primary Examiner*—Leo Friaglia
*Assistant Examiner*—Randall A. Schrecengost
*Attorney, Agent, or Firm*—Lane, Aitken, Dunner & Ziems

[57] ABSTRACT

A method and apparatus for facilitating the rapid connection and disconnection of a trailer tongue from a vehicle tongue having a connection of the type which requires separation therebetween to achieve such coupling. The apparatus comprises a base member capable of resting on a surface, such as the ground, and an adjustable, extended member secured to the base member and having a predetermined length. Means are provided for pivotally securing the base member and the extended member to the trailer tongue so that upon lateral movement of the trailer tongue and the vehicle tongue, the extended member causes the trailer tongue to uplift relative to the vehicle tongue as a result of the rotation of the adjustable member about the base member. The length of the extended member is selected to define a length sufficient to cause separation of the respective tongues. The apparatus also includes a support member for supporting the trailer tongue in a stable position after separation from the vehicle tongue. The method of connecting and disconnecting the respective tongues is also disclosed.

4 Claims, 7 Drawing Figures

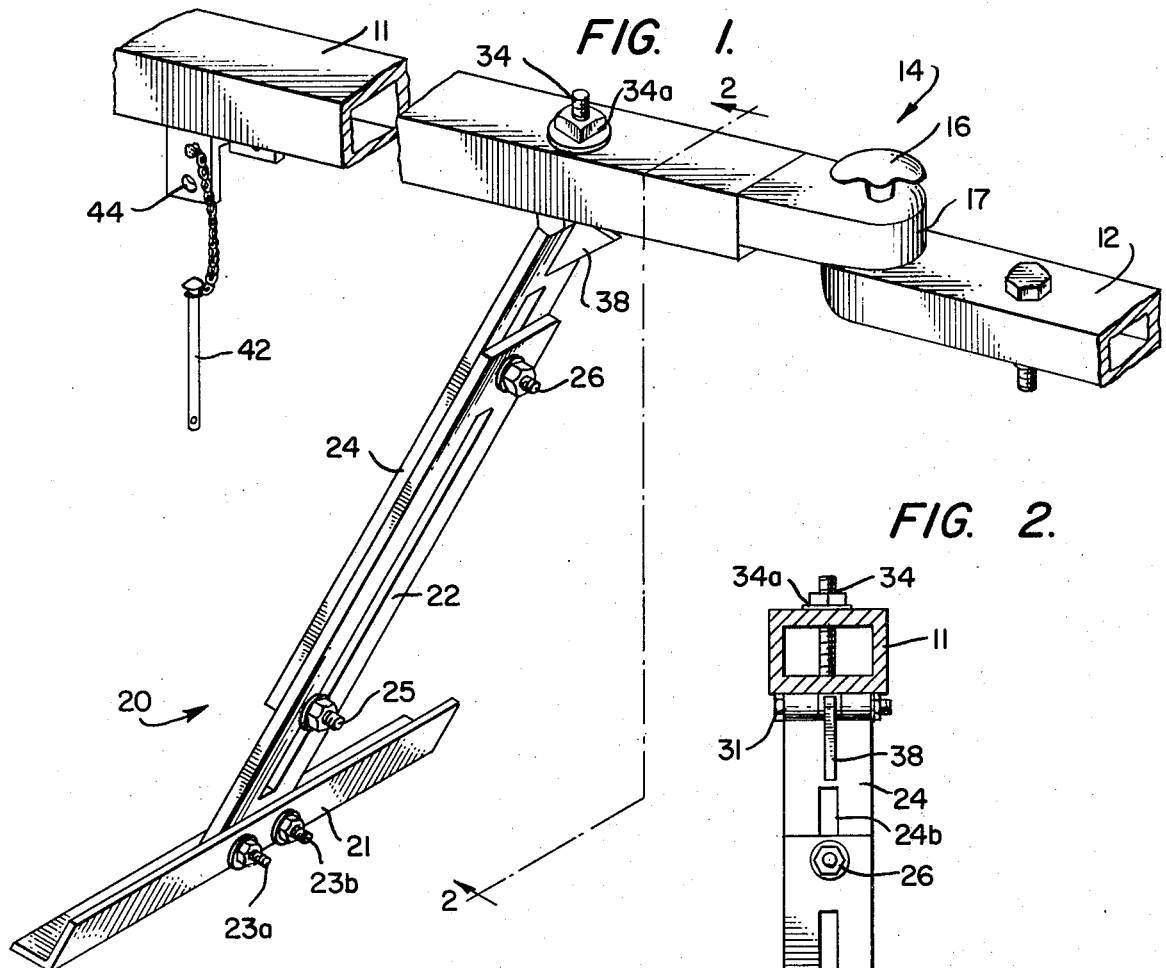
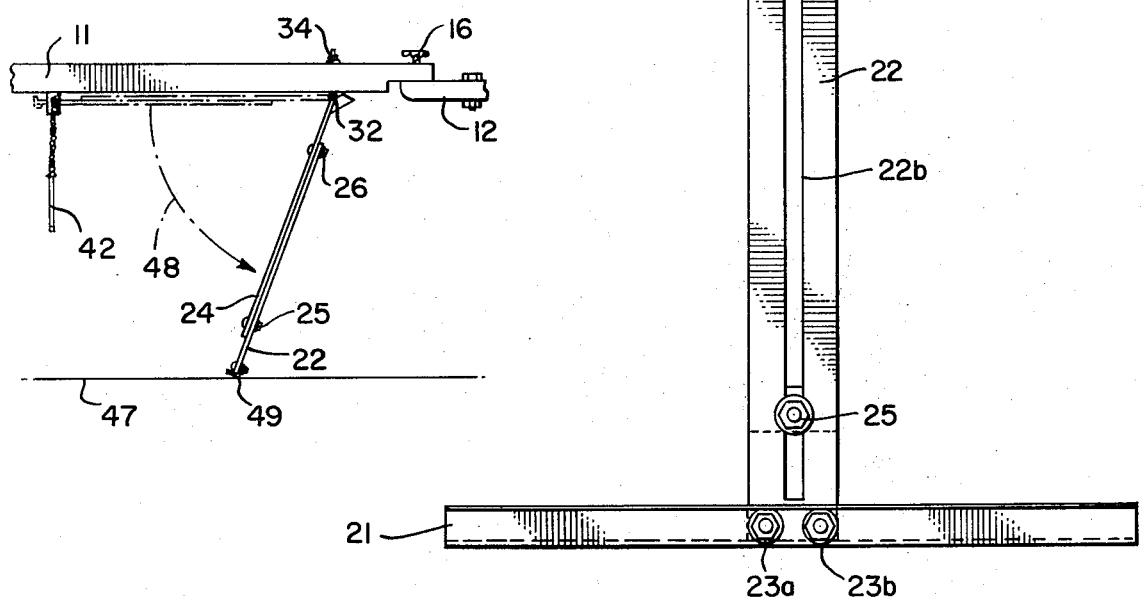

TRAILER ATTACHMENT

BACKGROUND OF THE INVENTION

This invention relates to an apparatus for facilitating the rapid connection and disconnection of in-line members. More particularly, this invention relates to a method and apparatus for quickly connecting and disconnecting members which require vertical separation therebetween during the coupling and decoupling operation. Still more particularly, this invention relates to an attachment for a trailer tongue on a vehicle to facilitate removal of the trailer tongue from the vehicle tongue on the draw vehicle.

In the prior art, there are a number of methods and apparatuses for facilitating the connection of one member to another. Often, such apparatuses or methods are particularly developed for certain installations. In general, however, in connection with one coupling concept, it is desired in the art to connect one member to another by overlapping the members and providing some type of connection therebetween. A typical example of such a connection is the trailer hitch which, in general, defines a ball member and a ball enveloping member respectively disposed on the tongues of a draw vehicle and a drawn vehicle. It is desired in this art to connect one member to another rapidly and efficiently, with a minimum of effort on the part of the users.

As now constituted, the typical connection and disconnection of the trailer tongue from the vehicle tongue requires a manual exertion of effort to raise the trailer tongue vertically separate from the vehicle tongue to permit the trailer tongue enveloping member to envelop the ball on the vehicle tongue. In certain installations, particularly where the weight of the load is substantial or horizontal travel is inconvenient, significant exertion may be required, running the risk of injury to the operator, or at least a grave inconvenience to achieve a connection or disconnection. Thus, it is a broad aim of this invention to provide an apparatus capable of being connected to the trailer tongue which will facilitate the rapid connection and disconnection of the trailer from the draw vehicle.

In addition, it is a characteristic of the art to require or desire that some type of apparatus be provided to permit the trailer tongue to rest thereupon during the storage position. Accordingly, it is an additional object of this invention to provide, in connection with the characteristics provided above, the capability of providing a stable landing gear for the trailer.

In addition, it is desired that such apparatus be capable of being neatly stowed relative to the trailer so that it does not interfere with the free travel of the trailer during the hauling operation.

Furthermore, it is desired that such apparatus be reasonable in cost to construct and easy to use, while presenting a neat appearance.

These and other objects and aims of the invention will become apparent from the review of the accompanying specification and description of the invention, taken in conjunction with the accompanying drawings.

BRIEF DESCRIPTION OF THE INVENTION

Directed to overcoming the shortcomings of the art and achieving the objects and aims stated above, this invention relates to an apparatus for facilitating the rapid connection and disconnection of a first member and a second member which require separation therebetween to achieve such coupling or uncoupling. In its preferred embodiment, the apparatus relates to the rapid connection and disconnection of a trailer tongue from a vehicle tongue, particularly of the type which utilizes a ball member on the vehicle tongue and a ball-enveloping member located on the trailer tongue and being manually secured on the ball member by the operator.

The apparatus comprises a base member capable of resting upon the ground surface and an adjustable, extended member secured to the base member and having a length sufficient to cause the uplifting of the trailer tongue relative to the vehicle tongue to a sufficient extent to permit the ball-enveloping member to free itself from the ball, whereupon the vehicle may be freed from the trailer. Means are provided for pivotally securing the extended member and the base member to the trailer tongue at a pivotable location so that the lateral movement of the trailer tongue and the vehicle tongue may cause the trailer tongue to uplift relative to the vehicle tongue as a result of the rotation of the extended member about the base member. In this manner, a drawn vehicle may be stopped at a predetermined point and the ball-enveloping member manually loosened, so that upon further lateral and rearward movement of the vehicle tongue, the trailer tongue is caused to uplift relative to the vehicle tongue to be freed therefrom. As indicated, the uplifting of the trailer tongue from the vehicle tongue is due to the fact that the length of the extended member is slightly longer than the distance between the ground and the position of the trailer tongue which will cause it to clear or free itself from the ball member.

The extended member also includes a base member secured thereto in such a position to support stably the trailer tongue in the at-rest position. The base member is designed to provide a sturdy base support for the trailer tongue while the support member supports the trailer tongue prior to securing the trailer and trailer tongue to the vehicle tongue from the starting position.

Moreover, means are provided for securing the extended member and the base member in a position substantially adjacent to the vehicle tongue when it is desired to have the apparatus stowed during travel of the trailer. The securing apparatus includes a generally U-shaped member secured to the vehicle tongue and a keeper member designed to pass through a pair of openings in register in the legs of the U-shaped member so that lateral movement of the extended member upwardly may be secured therein.

BRIEF DESCRIPTION OF THE DRAWINGS

In the drawings:

FIG. 1 is a perspective view of the apparatus according to the invention pivotally secured to a trailer tongue;

FIG. 2 is a vertical cross section of the apparatus according to the invention taken along line 2—2 of FIG. 1;

FIG. 3 is a side elevational view illustrating the apparatus in its dropped position before the trailer tongue is removed from the trailer hitch;

DETAILED DESCRIPTION OF THE PREFERRED EMBODIMENT

Figure 4:
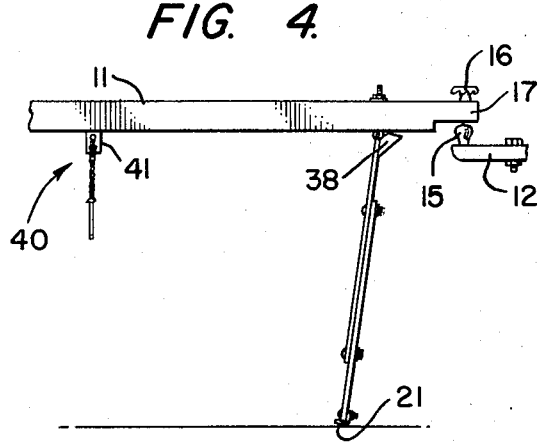
FIG. 4 is a side elevational view similar to FIG. 3 showing the trailer tongue uplifted from the ball on the vehicle tongue by pivoting the extended member about the base member.

In FIG. 1, a trailer tongue 11 is secured to a vehicle tongue 12 by a trailer hitch designated generally by the reference numeral 14. The trailer tongue 11 is secured to a trailer (not shown) and may be a hollow, tubular member which is rectangular in cross section. The vehicle tongue 12 is secured to the vehicle which draws the trailer and similarly may be a hollow, tubular member which is rectangular in cross section. The specific configurations of the tongues are not critical to the operation of the invention.

Figure 5:
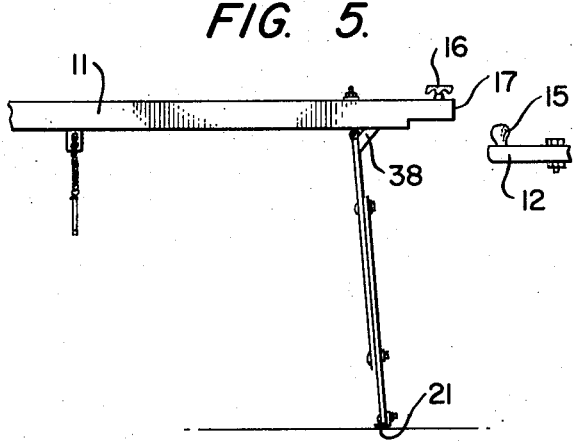
FIG. 5 is a side elevational view similar to the views shown in FIGS. 3 and 4 securing the disconnected trailer tongue in a stable position by contact between the support member and the trailer tongue.

The trailer hitch 14 is conventional, and for purposes of illustration, comprises a ball 15 best seen in FIGS. 4 and 5 and a tightening member 16 for securing the ball-mating or ball-enveloping member 17 to the ball 15 in a secure relationship. As is well known in the art, the trailer tongue 11 is secured to the vehicle tongue 12 by vertically separating the trailer tongue 11 from the vehicle tongue 12 with a sufficient clearance to permit the ball-mating member 17 to overlap and to be dropped down upon the ball 15 whereupon the manual actuation of the ball-tightening member 16 secures the trailer tongue 11 to the vehicle tongue 12 in a secure, rotatable relationship. For maneuverability and steering, the trailer tongue 11 is rotatable in a generally horizontal plane relative to the vehicle tongue 12.

The apparatus according to the invention is designated generally by the reference numeral 20. The apparatus 20 includes a base member 21 which, as shown, is generally L-shaped in cross section wherein one leg of the L-shaped member provides a surface about which the apparatus 20 may be pivoted.

A first slotted member 22 is fixedly secured to the base member 21 by a pair of fasteners 23a and 23b, which may comprise a bolt, a washer and a securing nut.

Figure 6:
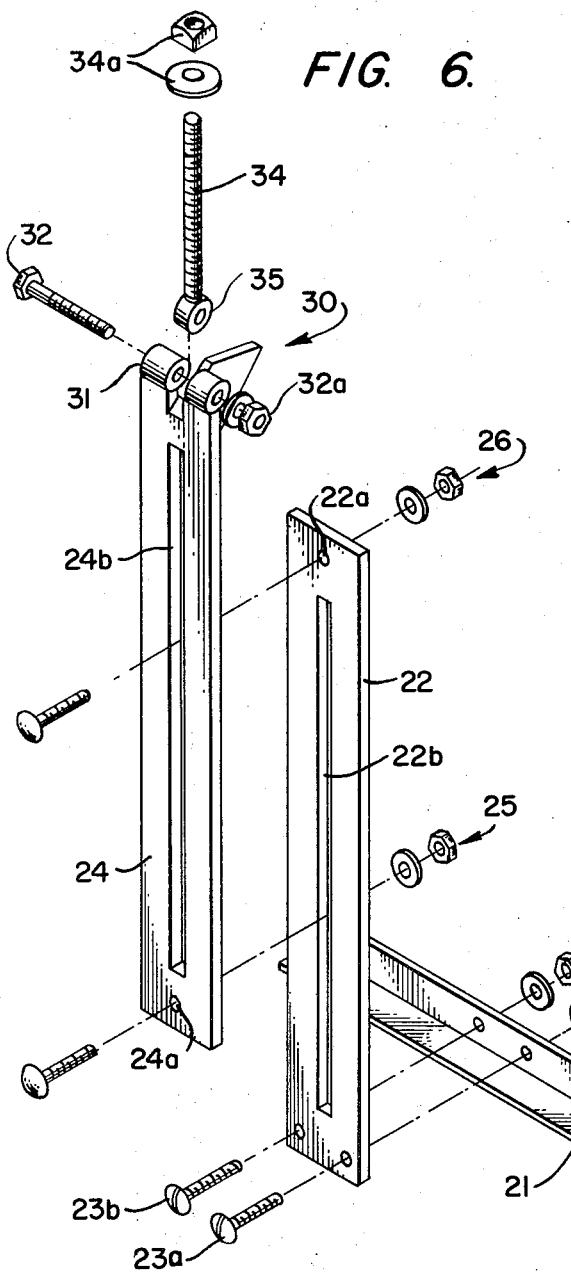
FIG. 6 is an exploded perspective view of the components of the apparatus according to the invention.

A second slotted member 24 is adjustably secured to the first slotted member by fastening members 25 and 26. As is best seen in FIG. 6, the fastening member 25 passes through a fixed opening 24a near the bottom of the second slotted member 24 and is received in the slot 22b of the first slotted member. The fastening member 26 is secured in the slot 24b of the second slotted member 24 and a fixed opening 22a in the first slotted member 22. By this arrangement, the first member 22 and the second member 24 are adjustably secured relative to one another.

The second slotted member is pivotally secured to the trailer tongue 11 by a pivotable connection designated generally by the reference numeral 30. The upper portion of the second slotted member 24 defines a pair of bifurcated cylindrical members 31 which are annular in cross section for receiving a fastening member 32 about which the apparatus 20 may pivot. The fastening member 32 is secured in the bore of the cylindrical member 31 by the nut and washer combination 32a. A threaded member 34 defines a cylindrical head portion 35 which is annular in cross section and arranged to nest in register with the cylindrical members 31 for receiving the fastening member 32 therethrough. By this arrangement, the apparatus 20 may pivot about the fastening member 32 and be secured by the threaded member 34 at its upper end thereof by the nut and washer combination 34a to the trailer tongue 11, as best seen in FIG. 2.

A stop member 38 is also secured to the second slotted member 24 to provide a bearing surface for the lower portion of the trailer tongue 11 as best seen in FIG. 5. The stop member 38 provides a stable supporting surface for the trailer tongue 11.

Figure 7:
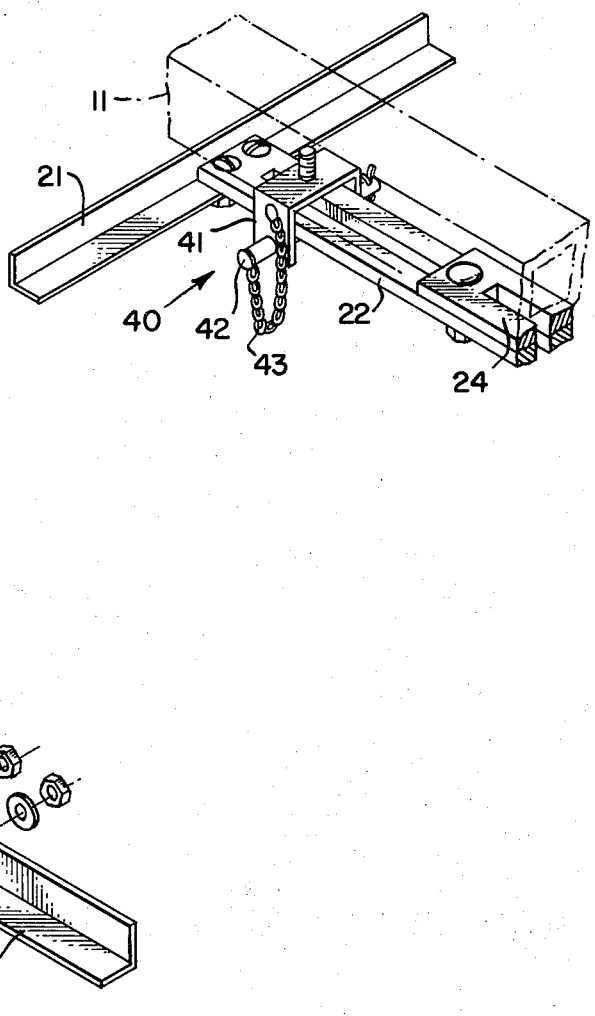
FIG. 7 is a fragmentary perspective view showing the invention in its uplifted and secured position when not in use.

During travel, or when otherwise not in use, the apparatus 20 is secured adjacent the lower portion of the trailer tongue 11 by a keeper assembly designated generally by the reference numeral 40. When thus secured, the apparatus 20 assumes the position shown in phantom outline in FIG. 3 and in detail in FIG. 7. The keeper assembly 40 comprises a generally U-shaped member 41 secured to the underside of the trailer tongue 11, for example, by a fastening member. A keeper member 42 is secured to a leg of the U-shaped member 41 by a chain 43. When the apparatus 20 is raised to its uppermost position, substantially parallel to the lower surface of the trailer tongue 11, the keeper member 42 is caused to pass through openings 44 (see FIG. 1) in register with the opposite legs of the U-shaped member 41 to retain the apparatus 20 therein. The at-rest position of the apparatus 20 is best seen in connection with FIG. 7.

The operation of the apparatus and method of connecting and disconnecting the trailer tongue 11 from the vehicle tongue 12 are best seen in connection with FIGS. 3, 4 and 5. Assuming that the vehicle has arrived at a stop point where it is desired to disconnect the trailer and retain the trailer at a predetermined location, such as in a garage, or for storage or the like, such position is shown in FIG. 3. In FIG. 3, the trailer is still securely connected to the vehicle, and the apparatus 20 is permitted to pivot from its stowed position to its lowermost position with the base member 21 resting upon a surface 47, such as the ground, the floor of a garage, driveway or the like. This is achieved by removing the keeper member 42 from the openings 44. The pivot of the apparatus 20 is shown by the dotted line 48 in FIG. 3.

When thus at rest, lateral movement of the vehicle tongue by movement of the vehicle in a direction toward the trailer tongue, and hence the trailer, causes the trailer tongue 11 to pivot about the point 49 in which the base member 21 contacts the surface 47. By suitably adjusting the height of the distance between the base member 21 and the pivot member 32, such a rearward motion of the vehicle will cause the trailer tongue to be lifted upwardly to free the ball-mating member 17 from the ball 15, as best seen in FIG. 4. Thereafter, the trailer is free to drift to the position shown in FIG. 5 in which the stop member 38 is in contact with the lower surface of the trailer tongue 11. Such a position provides a stable front structure for the trailer.

The height of the lift of the trailer tongue 11 relative to the vehicle tongue 12 is determined by the effective length of the apparatus 20. That length is adjustable, as previously described, because the first member 22 is adjustable relative to the second member 24 so that the height necessary to free the ball-mating member 17 from the ball member 15 is readily accommodated. In practice, it has been found advantageous to effect a minimal, but reasonable clearance between the ball-mating member 17 and the ball member 15 to minimize the degree of fall of the trailer tongue 11 when achieving the position as shown in FIG. 5.

In practice, it has been found that once the tightening member 16 is loosened and the apparatus 20 positioned as shown in FIG. 3, a slight impetus or nudge from the vehicle in the direction of the trailer will cause the trailer to free from the vehicle and come to rest as shown in FIG. 5 without additional manual intervention.

When attaching the trailer tongue 11 to the vehicle tongue 12, the vehicle is backed up to a predetermined point adjacent the trailer tongue, for example to position the ball member 15 perhaps 8 inches away from the ball-mating member 17. Thereafter, the trailer is gently rocked laterally, by manual effort, to pivot the trailer tongue 11 about the base member 21 in a sequence which is the reverse of that shown in FIGS. 3 through 5. Thereafter, the ball-mating member 17 gently achieves a position in register with the ball member 15 so that the ball-tightening member 16 may be manually operated to secure the trailer to the trailer hitch.

The precise distance between the ball member 15 and the ball-mating member 17 is, in large measure determined by the distance between the end points of the chord on the arc transcribed by the pivot pin 38 as the apparatus is connected. It has been found, in practice, however, that practice with the apparatus obviates the need for precise positioning of the respective members.

Thus, the method and apparatus for readily attaching and detaching a trailer to a vehicle has been disclosed and for providing a stable, supporting structure for the trailer tongue.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An apparatus for facilitating the rapid connection and disconnection of a first member and a second member which require a generally vertical separation therebetween to achieve such connection and disconnection and for supporting said first member when free from said second member, comprising:

a base member capable of resting on a surface, an extended member secured to said base member and having a predetermined adjustable length at least as great as the sum of distances between said surface and said first member and said separation, said extended member including a first elongated member defining a first elongated slot-like opening therein and a second elongated member defining a second elongated slot-like opening therein and releasable first securing means cooperating with said first and second elongated slot-like openings for securing said first and said second elongated members together to provide said predetermined length for said extended member;

second securing means for pivotally securing said extended member to said first member at a pivotal location thereon so that lateral movement of said first member and said second member causes said first member to uplift relative to said second member as a result of the rotation of said extended member about said base member to an extent at least equal to said separation, the length of said extended member being sufficient to uplift and free said first member relative to said second member to an extent sufficient to achieve said separation; and stop means secured to said extended member to support said first member in a stable position on said extended member after removal of said first member from said second member.

2. The apparatus as set forth in claim 1 further including third securing means for securing said base member and said extended member on said first member free from interference with said surface when said apparatus is not in use.

3. The apparatus as set forth in claim 1 wherein said first member is a trailer tongue, said second member is a vehicle tongue and further including means for connecting said trailer tongue to said vehicle tongue.

4. The apparatus as set forth in claim 1 wherein said second securing means includes a bolt member capable of being secured to said first member at one end thereof and defining an opening near the other end thereof, and said second elongated member defines at least an opening near one end thereof and a pin member cooperating with the openings in said bolt member and said second elongated member to pivotally secure one to the other.

* * * * *